Patented Nov. 3, 1931

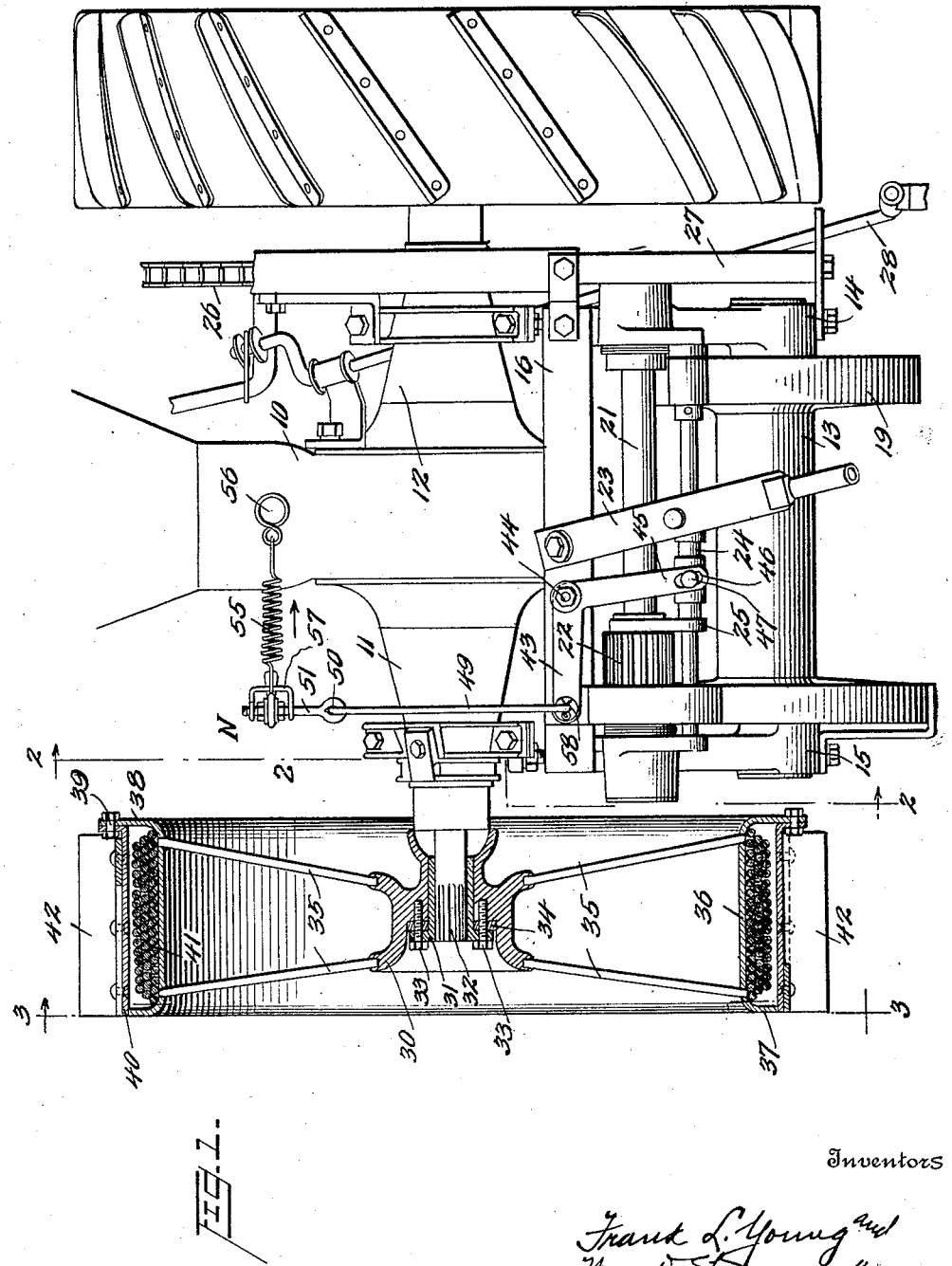

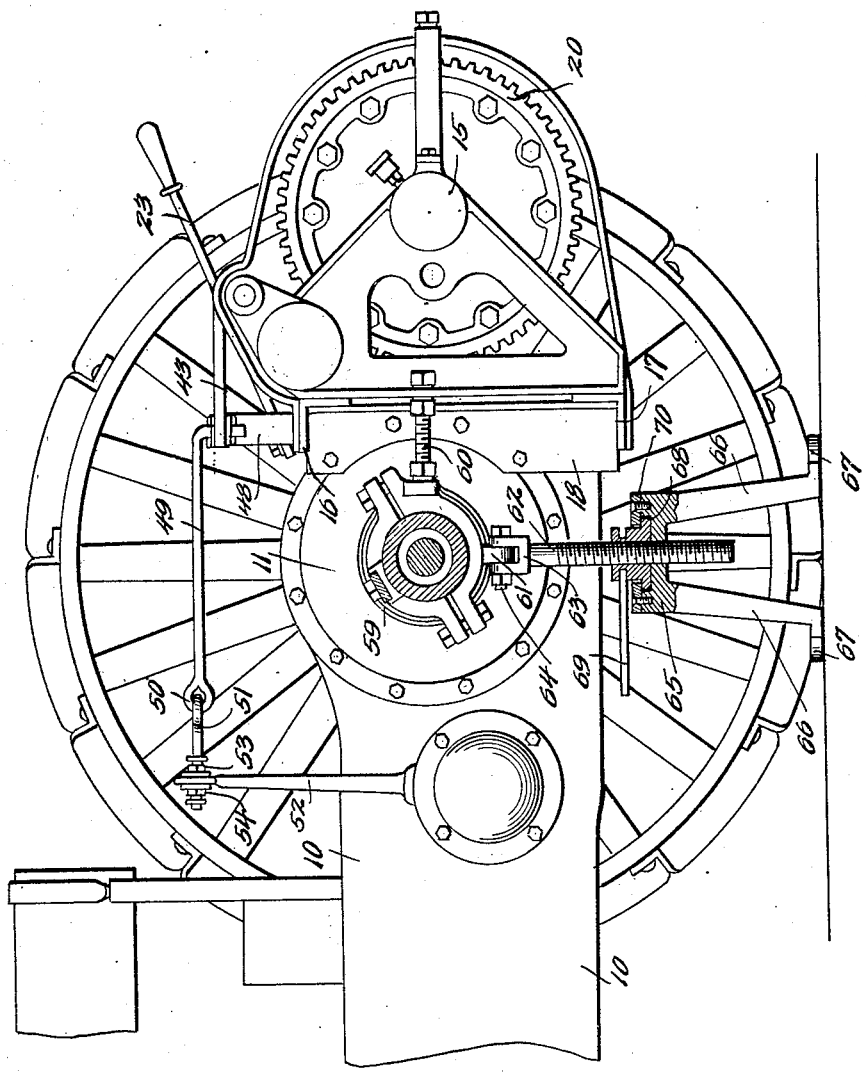

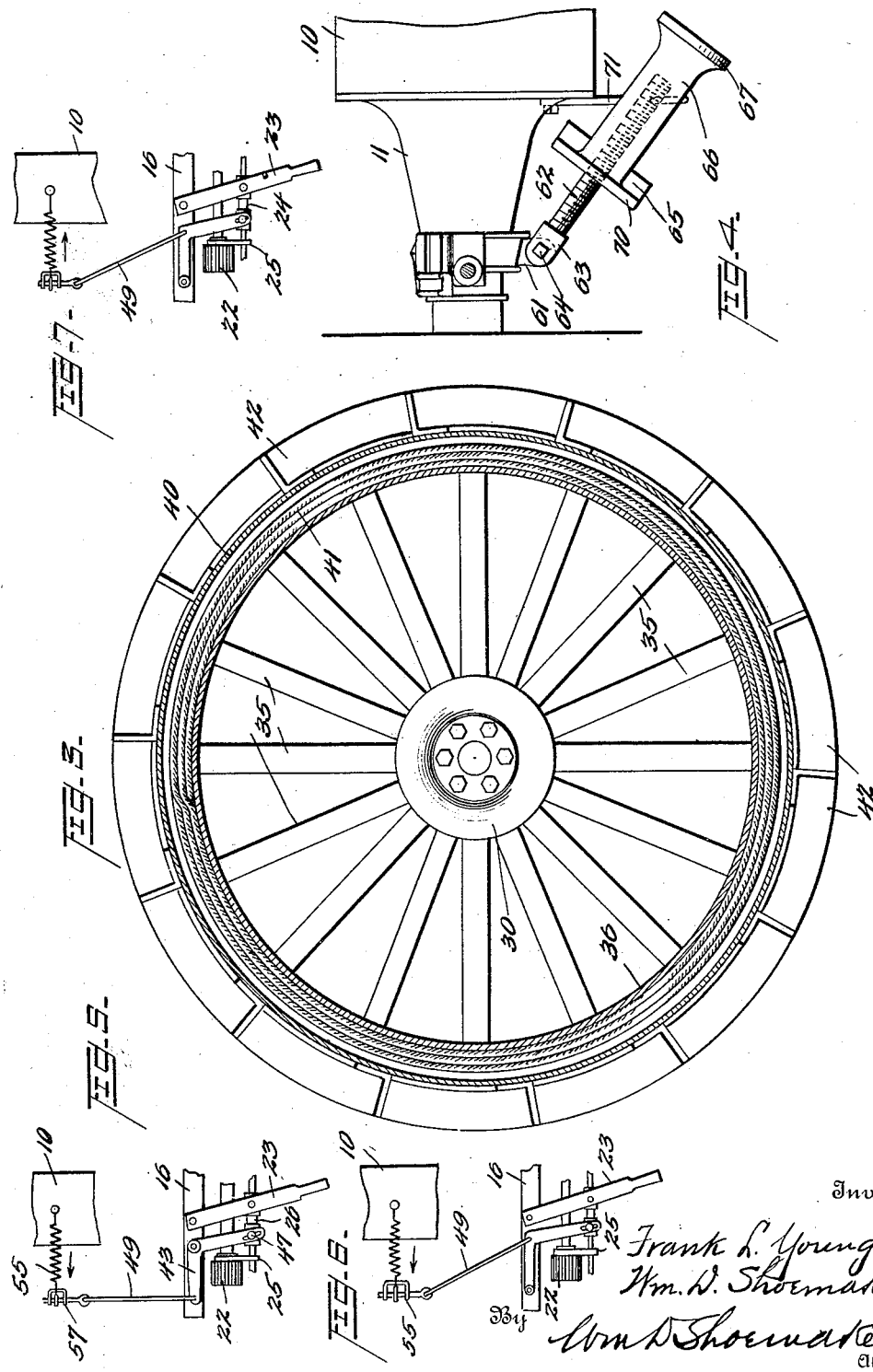

1,830,417

UNITED STATES PATENT OFFICE

FRANK L. YOUNG, OF WASHINGTON, DISTRICT OF COLUMBIA, AND WILLIAM D. SHOE-MAKER, OF DRUMMOND, CHEVY CHASE, MARYLAND; SAID YOUNG ASSIGNOR TO SAID SHOEMAKER

TRACTOR-EQUIPMENT COMBINATION

Application filed March 19, 1928. Serial No. 262,713.

This invention relates to tractor winches and particularly to such winches of the double drum type, although certain elements have a more general application.

The principal object of the invention is the production in a tractor winch combination of the facility of employing the tractor and winch attachments in a drag line use wherein is demanded greater spool capacity than has heretofore been possible with tractor winches.

Another object of the invention is the production of a tractor winch combination wherein both the tractor transmission and the belt pulley shaft are utilized as driving means for winches and are subjected to a unitary control so that when one winch is being driven, the other will be idle or ready for free reverse movement.

A still further object of the invention is the production of an extension gear shaft control for the tractor which may be utilized for any purpose desirable in connection with industrial tractor equipment.

A still further object of the invention is the production of the winch drum combined with a tractor wheel in such a manner that the wheel may be utilized to transport drag line cable in the use of the tractor and may be capable of operation as a winch when the tractor is stationary.

A further object of the invention is the provision in a combination of the type specified, or in any other connection employing industrial tractor equipment, of a jack which is carried by the housing of the tractor continuously and always ready for use in supporting the tractor slightly elevated above the ground.

A further object of the invention is the perfection of details in an extension gear shift control for the tractor whereby upon a change of parts a movement of the gear shift lever may be accomplished from neutral position to anyone of the four gear meshing positions.

Other objects of the invention will hereinafter appear in the following description and the novel features thereof will be particularly pointed out in the appended claims.

Like reference characters indicate like parts throughout the several figures of the drawings in which, Fig. 1 is a plan view of the winch combination, the tractor winch wheel being shown in section.

Fig. 2 is an elevation of one end of the tractor equipped with the winch combination, the winch wheel being removed for the purpose of more clearly showing the jack and etxension gear control.

Fig. 3 is a vertical section through the winch wheel.

Fig. 4 is an elevation of just those parts of the winch combination showing the jack mounting and illustrating the idle position of this jack, and Figs. 5, 6 and 7 are semi-diagrammatic views illustrating the several positions of the parts of the extension gear shift control when different gear positions are desired.

For the purpose of clearness of description, the tractor winch combination may be said to comprise a number of assemblies and these will be described in detail in their order given below, and the individual functions thereof are pointed out after which a recital of their conjoint use will be given.

Following this, it will be pointed out how the several assemblies may be used alone or in combination with each other or with other equipment to produce new and beneficial results.

The several assemblies are:
1. The rear end winch assembly.
2. The tractor winch wheel assembly.
3. The extension gear shift assembly.
4. The jack assembly.

The rear portion of the Fordson tractor, the tractor selected for the purpose of illustration, comprises a differential housing 10 and axle housings 11 and 12, which are bolted to the differential housing. A winding spool 13 is journaled in side frames 14 and 15, which are connected by cross angles 16 and 17, and these cross angles are in turn connected to the differential housing by attaching angles 18, one of which is shown clearly in Fig. 2. The winding spool 13 is provided at one end with a brake 19, and at its other end with a spool gear 20 in ring form. Both of these parts are adequately guarded. Mounted in bearings in the side frames is a countershaft 21, slidably mounted upon which is the pinion 22, which is thrown into and out of mesh with the gear 20 by means of shift lever 23 acting through the coupling 24 and yoke 25.

The winch is driven by a chain 26 from the belt pulley shaft of the tractor through a sprocket lying under the guard 27, which sprocket is keyed on the end of the counter shaft 21. An extension clutch control 28 is provided for cutting off the power at its source.

The details of the rear end winch are of small importance in this combination of winch elements. Any rear end winch would operate in the combination quite as well as the one just described; and indeed a front end which is equally available as will be appreciated. The description given of the rear end winch is necessary only to assist in pointing out the conjoint use of the several elements of this winch combination.

It will be appreciated, however, and distinctly understood that one of the principal objects of the invention is the ability to use these standard types of rear end winches known as the Myers, in this combination, and that one who has the Myers winch in use may convert it into a combination of the kind covered by this description by purchasing only the additional parts. In that respect this invention is unique in that it is made up of units which have complete individual functions of their own, and are only brought together in a new relationship to accomplish the unitary purpose of providing a drag line winch combination tractor having ample spool capacity.

In the use of a tractor winch for drag line work, it is a problem of obtaining ample spool capacity on the separate drums. The outhaul cable to be used in the work is usually of small dimension, but there must be enough of it to permit its reaching over an extended distance to a turning sheave beyond the work, as well as enough to come back to the shovel or bucket employed in the conveying of material.

Drag line work has been done by tractor winches, but it has been necessary to cut down the spool capacity of the two drums to such an extent that only a small drag line job can be accomplished. The spool capacity of the Myers winch illustrated and mounted on the rear end of the tractor is ample for the power line, and it is proposed to use for the drum of the outhauling line one of the tractor wheels.

The hub 30 is similar to the hub of the standard Fordson tractor wheel and is mounted on the tractor in the same manner. It is provided with a sleeve 31, fitting the splined end 32 of the tractor axle. The sleeve is attached to the hub by the machine bolts 33, by means of which the sleeve is caused to bind upon the axle end. The spacer 34 lies between the flanged end of the sleeve and the hub shoulder.

It is not unusual to use different sizes of cables upon a single winch in an industrial field. For instance in the oil field, bailing of wells requires a long length of cable to reach to the bottom of the well; fishing for lost tools demands the same type of cable. On the other hand, pulling of tubing requires only a short length of stouter cable. Pulling of rods might be classified with the pulling of tubing, although the strain on a relatively short line of rods would demand a smaller cable than a relatively long line of rods. Again, a stouter cable wears a great deal more than a smaller cable when wound upon the same size of spool. Therefore, it will be appreciated that an oil operator is anxious to secure a facility for using different sizes of cable in his work, dependent upon the various conditions and uses to which his equipment is placed. The equipment of a tractor with a winch and with wheels of the type just described will enable an oil operator to obtain the facility which he demands in the use of this type of equipment.

Drag line work in like manner makes varying demands upon the equipment employed for it. There is always a power line to be wound upon the main spool, and the construction of the Myers winch described herein is admirably adapted for such a power cable. It has ample spool capacity to permit of the use of a relatively long power line. It has also the capability of obtaining by use of different sizes of sprockets a pull of greater or less degree, dependent upon the demands of the job. It is mounted in a convenient place on the tractor and the tractor with which it is equipped may be adequately anchored.

The wheel drum shown to the left in Fig. 1 is admirably adapted for the purposes of the outhaul line. The diameter of the drum insures a high speed on the line which is desirable in this work.

The residual requirement is that these two drums shall be subject to a unitary control whereby when the powered drum is inactive and free to reverse, the wheel drum will be in position to act and when the wheel drum is inactive and free to reverse, the powered drum will be active.

It will be obvious that the wheel drum attains its power through the transmission of the tractor and for this purpose a jack is provided which will be hereinafter described whereby the cover 40 may be removed from the wheel and the remaining parts left suspended in the air out of contact with the ground. The opposite wheel of the tractor is in contact with the ground and is held in that position, so that the power transmitted through the transmission mechanism is imparted to the wheel drum. On the other hand, the powered drum is driven from the belt pulley shaft of the tractor. The belt pulley shaft and the transmission mechanism are both under the control of the tractor clutch and a depression of the tractor clutch will therefore cut off the power to both the wheel winch and the power winch.

Spokes 35 connect the hub with the rim 36 which is in channel form, the inner leg 38 of the channel being longer than the outer leg 37. A cover 40 is attached to the leg 38 by means of the bolts 39 and the outer end of the cover is supported upon the edge of the leg 37.

The space between the rim and cover constitutes a compartment for the cable 41 and it will be appreciated that the rim 36 has suitable means for permitting the attachment of the cable whereby the rim can be employed as a drum when the cover 40 is removed. It is also provided with suitable means for clamping the free end of the cable. The means for clamping the ends of the cable are conventional and are not shown in the drawings. The cover is braced by cleats 42 attached thereto by rivets, these rivets being counter-sunk in the cover whereby they do not constitute any obstructions to the cable in the applying of the cover to the rim.

It will be appreciated that the wheel drum just described when the cover is in place constitutes a wheel for the tractor and can be used as such in the ordinary use to which the tractor is put. It might be employed on both sides of the tractor and would be found particularly useful in connection with a tractor equipped with a winch, since it would enable the winch user to carry with him cable of various sizes for use on the winch in different work which he has to do.

In order that the two winches may be alternately placed under power and controlled from a unitary means, provision is made for the movement of the tractor gear shift lever at the same time that the pinion 22 is moved under the influence of the lever 23. While a number of mechanisms might be devised for this purpose, there is shown in the drawings one which comprises a bell crank 43 pivoted at 44 to the upper cross angle 16 and having one arm 45 provided with an elongated slot 46, adapted to receive a projection 47 from the coupling 24. It will be appreciated that this projection 47 may be mounted upon the coupling in any suitable manner and that this connection between the arm 45 and the coupling will cause the rocking of the bell crank during the movement of the pinion 22.

The pivot 44 is mounted upon a stub 48 rising from the angle 16. The other arm of the bell crank is provided at its end with a means for connecting a link 49 which in turn is universally connected at 50 to an eye bolt 51 which passes through the upper end of the shift lever 52 of the tractor, and is held to such shift lever by means of the lock nuts 53 and 54.

It will be appreciated that the shift lever of the tractor shown in Fig. 1 is in reverse position but that it will be moved into neutral position, which is indicated by the letter N, in said figure, and that with the parts in position shown, the shift lever will move from reverse to neutral as the pinion 22 is moved from inactive to meshed position with the gear of the winch, and further that upon a movement of the gear from meshed position, the shift lever will be moved into reverse. To accomplish this, a spring 55 tending to pull the lever in the direction of the arrow is provided, one end of which is attached to the tractor, at 56, while the other end is attached to a yoke 57 on the eye bolt straddling the shift lever. If the spring 55 were one tending to throw the shift lever in a direction opposite to that of the arrow, it will be appreciated that the shift lever will assume an active position in second gear, the position being indicated by the numeral 2 on the drawings.

It is desirable in different characters of drag line work to vary the speed of the outhauling line dependent upon the power required in its operation. In order that all the speeds of the tractor transmission may be made available, the pivot 44 is made interchangeable in position with the connection 58 between the link 49 and the arm of bell crank 43. This change of position is indicated in a partially diagrammatic manner in Figs. 6 and 7, and it will be appreciated that the shift lever will now have a forward movement from neutral position rather than a backward one as hereinafter explained.

Referring to the Figs. 5, 6 and 7, Fig. 5 represents the position of the parts when the spring 55 has been changed to a compression spring, when the driving position is second; Fig. 6 represents the position of the parts when the pivots 44 and 58 have been interchanged in position, and the spring 55 has been changed to a compression spring when the drive position will be first; while Fig. 7 represents the parts with the pivots interchanged in position when the drive position will be third.

It will be obvious that the unitary control of movements of the gear shift lever and the winch pinion under the influence of the lever 23 will produce an alternate drive of the wheel drum and the power drum and that a wide range of speeds for both drums as well as a change of direction of drive for the wheel drum; the variation of speed for the power drum is obtained through the control of the throttle.

It will be further appreciated that a control of this kind is not limited in its use to this combination of elements but will be found useful in any situation in which advantage is being taken of both the belt pulley shaft and the transmission mechanism of the tractor for the purposes of producing alternate drives for any two elements which may be substituted for the rear winch and the wheel drum.

In order to use the wheel drum either as a storage means for cable or as an element for a drag line combination, it will be necessary to lift it slightly off the ground for the purpose of permitting its rotation. This is accomplished by the provision of a jack. While any form of jack might be used as an element of the drag line combination, the one chosen is permanently mounted on the tractor, is shown on the drawings, and will now be described. A clamp composed of the member 59 is a part of the attaching means of the tractor and connects the side frame to the axle housing through the medium of the screw bolt 60.

From the lower clamp member 59 is a lug 61 on which is pivoted a stem 62 by means of the yoke 63 and bolt 64. The stem is screw threaded and is moveable with relation to the stand 65 which comprises the legs 66 and feet 67. In the stand is mounted a turn nut 68 acted upon by the handle 69 and working on the screw threaded stem to lift or lower the axle housing as will be apparent. The collar 70 holds the nut upon the stand and the handle 69 is made as a removable part.

It will be seen from an inspection of Fig. 4 that this jack may be folded up out of position and held there by any suitable means, as a hook 71, during the travel of the tractor.

From the foregoing detail description, the individual functions of the several parts ought to be apparent, and there remains for a full and complete disclosure only a recital of the conjoint use of these parts in a drag line tractor winch combination, and to comment briefly upon the usefulness of certain sub-combinations.

In drag line work, the outhaul line demands relatively high speed as compared with the power line and is not necessary to be upon a drum made as strong as the power drum. The wheel drum of this disclosure is ample for this purpose and its employment accomplishes these results.

For the purpose of illustrating the usefulness of the invention, it will be supposed that the tractor owner desires to haul gravel from a gravel pit. The power line will be attached to a scoop or the like, and the outhaul line after passing around an anchor pulley, is attached to the rear of the scoop. A shifting of the pinion 22 into meshing with the winch gear and the lifting of the clutch lever will cause the power line to pull the scoop forward until it is filled and after it has been filled enable it to convey the scoop any distance within the capacity of the drum in winding cable.

When the scoop has been dumped, the unitary control of the shift lever and pinion is operated, upon a depression of the tractor clutch; this will cause the transmission mechanism to be put into condition to rotate the wheel when the clutch is again lifted. Upon the application of power to the transmission the wheel drum will return the scoop to its position for active duty.

It will be appreciated that the outhaul cable might come in either at the upper part or the lower part of the wheel drum, dependent upon whether the unitary control is positioned for a forward or a reverse drive.

It will be obvious that the jack provided will lift the wheel sufficient to enable the cover to be removed when the wheel drum will be sufficiently off the ground to permit of its successful operation. Although all the elements described are useful in a drag line winch combination, these elements may be used in combination with each other in other ways, and as indicative of these additional uses, the following may be recited:

Instead of a winch on the rear of the tractor a saw might be mounted which will be driven from the belt pulley shaft. In connection with a saw, it might be desirable to bring up logs to the tractor. Then the sawyer can stop the movement of the saw and throw in the tractor wheel drum, for the purpose of pulling up a log. Or, it may be that instead of the wheel drum a pulley drive might be placed on the end of the tractor shaft axle for the purpose of driving a saw mill located at a distance from the tractor and through means of a belt. In that case, the winch could be employed as the means for conveying the log to the saw mill. In either of these cases, the unitary control in connection with some of the parts shown in this application would be useful as a sub-combination.

The use of the wheel drum as a transporting means for cable is independent of its use as an element of the drag line combination. The jack as an element of the tractor to be carried by it would be desirable for use in connection with a cable storing wheel.

The facility pointed out on the extension gear shift control whereby a selective drive from the tractor power transmission is obtained in connection with a control of power from the belt pulley shaft, is a feature which might be utilized in a variety of equipment for tractors.

Suppose that the tractor is being employed to drag heavy pieces of machinery over rough ground, the operator of the winch can stand to a side of the tractor while machinery is being pulled up to the tractor through the power line of the winch. To advance the tractor to a new position, it will not be necessary for the operator to mount the tractor if it is equipped with the extension gear shaft control here shown, as the mere pulling out of the pinion 22 from mesh will throw the gear shaft into an active position.

It will be appreciated in this connection that an extension clutch control such as has been repeatedly shown in patents to Harry S. Myers for tractor winches is desirable in this use.

What is claimed is:

1. In a tractor-winch combination, a tractor, a plurality of separate hoist attachments mounted upon the tractor, means for individually and directly driving each hoist from the tractor power plant, and a unitary device for controlling the application of driving power alternately to said hoisting attachments.

2. The combination specified in claim 1 wherein the power from the tractor is applied to the hoist attachments through a common clutch, the release of which cuts off the drive from the hoist attachments.

3. In a tractor-winch combination, a tractor comprising a power plant supplying power to a belt pulley shaft and to a transmission mechanism for the tractive wheels, a hoisting drum driven from the belt pulley shaft, a second drum driven from the transmission mechanism, and means for controlling the power from the tractor to said drums.

4. In a tractor-winch combination, a tractor comprising a power plant supplying power to a belt pulley shaft and to a transmission mechanism for the tractive wheels, a hoisting attachment mounted upon the body of the tractor and driven from the belt pulley shaft, a wheel drum mounted upon the end of an axle and revolved by the transmission mechanism, and a device for controlling the application of tractor power to said hoisting attachment and to said wheel drum alternately.

5. The combination specified in claim 4 wherein the power from the tractor is applied to the hoist attachment and wheel drum through a common clutch, the release of which cuts off the drive from the tractor power shaft.

6. The combination specified in claim 4 wherein the power controlling device is selective to secure for the wheel drum any one of the several speeds of the transmission mechanism.

7. The combination specified in claim 4 wherein the wheel drum is a substitute for one of the tractive wheels and is capable of being employed as a tractive wheel as well as a storage for cable in the travel of the tractor.

8. In a tractor-winch combination, a tractor comprising a power plant supplying power to a belt pulley shaft and to a transmission mechanism for the tractive wheels, including a gear shift, and comprising also an axle housing, a hoisting attachment mounted upon the rear of the tractor and comprising a frame supporting active hoist elements powered from the belt pulley shaft, a wheel drum mounted upon the axle housing and receiving motion from the transmission mechanism, and suitable controls for said hoisting attachment and wheel drum comprising an exterior gear shift for said tractor, a power cut-off for the active hoist elements, and connections between the gear shift and power cut-off whereby when power is cut off from the hoist elements the gear shift will be in active position and vice versa.

9. The combination specified in claim 8 wherein the elements of the extension gear shift control are capable of a change of position to secure a selective drive for said wheel winch.

10. In a tractor-equipment combination, a tractor comprising a power plant supplying power to a belt pulley shaft and to a transmission mechanism for the tractive wheels, a pair of pieces of equipment each comprising active elements designed to be powered, respectively, from the belt pulley shaft and the transmission mechanism, and means for controlling the application of power to said pair of pieces of equipment comprising gear shift of the tractor, a cut-off for the power of said belt pulley shaft, and connections between the gear shift and the power cut off whereby these are operable in unison.

11. The combination of claim 12 wherein the connection between the gear shift and power cut off may be altered in relative positions to permit of a selective equipment drive from the tractor transmission.

12. In a tractor equipment combination, a tractor comprising a power plant supplying power to a belt pulley shaft and to a transmission mechanism for the tractive wheels, a pair of pieces of equipment comprising active elements designed to be powered, respectively, from the belt pulley shaft and the transmission mechanism and bearing the special relationship that when the active elements of one piece are powered the active elements of the other piece are inactive, and means for controlling the alternate application of power to said pair of pieces of equipment comprising the gear shift of the tractor and a power cut off for the power from the belt pulley shaft and connections between the gear shift and power cut-off whereby these are operable in unison.

In testimony whereof we affix our signatures.

FRANK L. YOUNG.
WM. D. SHOEMAKER.